United States Patent [19]

Brunelle et al.

[11] Patent Number: 4,727,134

[45] Date of Patent: Feb. 23, 1988

[54] METHOD FOR PREPARING CYCLIC POLYCARBONATE OLIGOMER MIXTURES

[75] Inventors: Daniel J. Brunelle; Eugene P. Boden, both of Scotia; Thomas G. Shannon, Schenectady, all of N.Y.

[73] Assignee: General Electric Company, Schenectady, N.Y.

[21] Appl. No.: 871,641

[22] Filed: Jun. 6, 1986

Related U.S. Application Data

[63] Continuation-in-part of Ser. No. 704,122, Feb. 22, 1985, Pat. No. 4,644,053, and a continuation-in-part of Ser. No. 714,224, Mar. 20, 1985, abandoned, said Ser. No. 704,122, and a continuation-in-part of Ser. No. 609,407.

[51] Int. Cl.$^4$ .............................................. C08G 63/62
[52] U.S. Cl. ..................... 528/371; 528/370; 528/372; 528/373; 549/1; 549/228
[58] Field of Search ............... 528/371, 372, 370, 373; 549/228, 1

[56] References Cited

U.S. PATENT DOCUMENTS

| | | | |
|---|---|---|---|
| 3,155,683 | 11/1964 | Moody | 528/370 |
| 3,274,214 | 9/1966 | Prochaska | 528/370 |
| 3,297,634 | 1/1967 | Oxenrider et al. | 528/371 |
| 3,299,948 | 1/1967 | Weirauch et al. | 528/370 |
| 3,386,954 | 6/1968 | Schnell et al. | 528/370 |
| 3,422,119 | 1/1969 | Prochaska | 528/370 |
| 4,644,053 | 2/1987 | Brunelle et al. | 528/370 |

FOREIGN PATENT DOCUMENTS 1229101 11/1966 Fed. Rep. of Germany.

OTHER PUBLICATIONS

Schnell et al., *Makromol. Chem.*, 57, 1–11 (1962).
C.A., 97 21689t, 216893u, 216894v (1982).

Primary Examiner—Harold D. Anderson
Attorney, Agent, or Firm—William H. Pittman; James C. Davis, Jr.; James Magee, Jr.

[57] ABSTRACT

Cyclic polycarbonate (or thiol analog) oligomer mixtures are prepared by the reaction of bishaloformates or their thio analogs, or mixtures thereof with dihydroxy or dimercapto compounds, with alkali metal hydroxides and various amines. The oligomer mixtures may be converted to polycarbonates or their thiol analogs by a method which is particularly adaptable to integration with polycarbonate processing operations. Polymerization may be conducted simultaneously with molding, extrusion and the like. The oligomer mixtures are adaptable to the preparation of filled prepregs.

14 Claims, No Drawings

METHOD FOR PREPARING CYCLIC POLYCARBONATE OLIGOMER MIXTURES

This application is a continuation-in-part of copending applications Ser. No. 704,122, filed Feb. 22, 1985, now U.S. Pat. No. 4,644,053, and Ser. No. 714,224, filed Mar. 20, 1985, now abandoned. Ser. No. 704,122, now U.S. Pat. No. 4,644,053 is in turn a continuation-in-part of Ser. No. 609,407, filed May 11, 1984, now abandoned.

This invention relates to compositions of matter useful in the preparation of high molecular weight resins such as polycarbonates, and to methods for their preparation and use.

Polycarbonates are typically produced by the reaction of bisphenols with phosgene. This reaction is normally conducted interfacially; that is, in a mixed aqueous-organic system which results in recovery of the polycarbonate in the organic phase. Before the polycarbonate can be extruded, molded or otherwise worked, it must be freed of organic solvent and traces of water and by-products. It is then normally obtained as a solid which must be subjected to relatively cumbersome, high-temperature processing techniques.

Another method of preparing polycarbonates is by transesterification with a bisphenol of a carbonate ester such as diphenyl carbonate or a bis-polyfluoroalkyl carbonate. This method is similar to the phosgene method in the necessity for separation from the product of by-products, many of which are relatively volatile, before processing is possible.

The preparation of low molecular weight cyclic aromatic carbonate polymers and their conversion to linear polycarbonates are known. Reference is made, for example, to the following U.S. patents:

U.S. Pat. No. 3,155,683,
U.S. Pat. No. 3,274,214
U.S. Pat. No. 3,386,954
U.S. Pat. No. 3,422,119.

The cyclic polymers disclosed therein, however, are single compounds having melting points which are generally too high to permit their convenient use as polycarbonate precursors. For example, the cyclic bisphenol A carbonate trimer disclosed in Example 2 of the aforementioned U.S. Pat. No. 3,274,214 melts at 335°–340° C., with polymerization.

According to U.S. Pat. No. 4,299,948, cyclic polycarbonates of high molecular weight (15,000 or above) may be prepared from a bisphenol bischloroformate in the presence of triethylamine as catalyst. However, this cyclic product is a final polymer which cannot conveniently be used as an intermediate for the production of linear polycarbonates because of its high viscosity.

A principal object of the present invention, therefore, is to provide convenient intermediates for the preparation of polycarbonate resins and their thiol analogs.

Another object is to provide intermediates which are easily prepared and have properties which enable them to be used in integrated resin preparation-processing methods.

Another object is to provide a method for preparation of such intermediates.

A further object is to provide novel polycarbonates and thiol analogs thereof, as well as methods for their preparation.

A further object is to prepare articles comprising very high molecular weight polycarbonates.

A further object is to provide a method for preparing resins, said method being capable of integration with processing operations thereon.

Still another object is to provide compositions suitable for use in the production of polycarbonate composites, especially continuous-fiber composites.

A still further object is to provide compositions which are capable of effectively impregnating continuous fibers at relatively low temperatures.

A still further object is to produce articles comprising thermoplastic polycarbonate resins and continuous fiber fillers, said articles having advantageous properties.

Other objects will in part be obvious and will in part appear hereinafter.

In one of its aspects, the present invention is directed to compositions consisting essentially of mixtures of cyclic oligomers having varying degrees of polymerization from 2 to about 30, the structural units in said oligomers having the formula

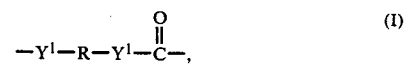

wherein at least about 60% of the total number of R values are aromatic organic radicals and the balance thereof are aliphatic, alicyclic or aromatic organic radicals, and each $Y^1$ is independently oxygen or sulfur.

Before proceeding with a detailed discussion of the invention, it may be useful to explain some terms used herein. The term "thiol analog", when used with reference to dihydroxy compounds, oligomers and polycarbonates, includes monothio and dithio compounds in which the carbonsulfur bonds are single bonds only. The terms "resin" and "resinous composition" include polycarbonates and polymers containing thiol analogs of the carbonates.

As will be apparent from the above, the cyclic oligomer mixtures of this invention may contain organic carbonate, thiolcarbonate and/or dithiolcarbonate units. The various R values therein may be different but are usually the same. At least about 60% of the total number of R values are aromatic and the balance may be aliphatic, alicyclic, aromatic or mixed; those which are aliphatic or alicyclic generally contain up to about 8 carbon atoms. The R values may contain substituents such as halo, nitro, alkoxy, lactone and the like. Most often, however, all R radicals are hydrocarbon radicals.

Preferably at least about 80% of the total number of R values in the cyclic oligomer mixtures, and most desirably all of said R values, are aromatic. The aromatic R radicals preferably have the formula

wherein each of $A^1$ and $A^2$ is a monocyclic divalent aromatic radical and $Y^2$ is a bridging radical in which one or two atoms separate $A^1$ from $A^2$. The free valence bonds in formula II are usually in the meta or para positions of $A^1$ and $A^2$ in relation to $Y^2$.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^2$, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The R values may be considered as being derived from dihydroxy compounds of the formula HO—R—OH (or the corresponding dithio compounds), especially dihydroxyaromatic compounds and preferably bisphenols of the formula HO—$A^1$—$Y^2$—$A^2$—OH. The following dihydroxy compounds are illustrative:

Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl)ether
Bis(4-hydroxyphenyl)sulfide
Bis(4-hydroxyphenyl)sulfoxide
Bis(4-hydroxyphenyl)sulfone
Bis(3,5-dimethyl-4-hydroxyphenyl)sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

As noted, each $Y^1$ value is independently oxygen or sulfur. Most often, all $Y^1$ values are oxygen and the corresponding compositions are cyclic polycarbonate oligomer mixtures.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

It has been discovered that the cyclic oligomer mixtures of this invention contain very low proportions of linear oligomers. In general, no more than about 10% by weight, and most often no more than about 5%, of such linear oligomers are present. The mixtures also usually contain low percentages (frequently less than 30% and preferably no higher than about 20%) of the polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

The cyclic oligomer mixtures of this invention may be prepared by a condensation reaction involving at least one compound selected from the group consisting of bishaloformates and thiol analogs thereof, said compounds having the formula $$R(Y^1COX)_2, \qquad (III)$$

wherein R and $Y^1$ are as defined hereinabove and X is chlorine or bromine. The condensation reaction typically takes place interfacially when a solution of said compound in a substantially non-polar organic liquid is contacted with a tertiary amine from a specific class and an aqueous alkali metal hydroxide solution.

Accordingly, another embodiment of the present invention is a method for preparing a composition comprising cyclic polycarbonate or thiol analog oligomers which comprises the steps of:

I. contacting (A) a composition comprising (1) at least one compound having formula III, or a mixture thereof with (2) at least one bis(active hydrogen) compound having the formula $$R(Y^3H)_2, \qquad \text{(IV)}$$

wherein each $Y^3$ is independently sulfur when the corresponding R is aliphatic or alicyclic and oxygen or sulfur when the corresponding R is aromatic, or an alkali metal salt thereof, with (B) at least one oleophilic aliphatic or heterocyclic tertiary amine and (C) an aqueous alkali or alkaline earth metal hydroxide or carbonate solution said contact being effected under conditions whereby reagent A is maintained in low concentration in (D) a substantially non-polar organic liquid which forms a two-phase system with water; and subsequently II. separating the resulting cyclic oligomer mixture from at least a portion of the high polymer and insoluble material present.

Reagent A, as indicated, is a composition comprising compounds of formula III (reagent A-1) and, optionally, compounds of formula IV (reagent A-2). It may also contain other compounds, including oligomers of the formula

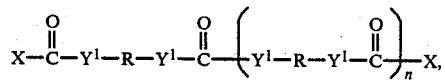

where R, $Y^1$ and X are as previously defined and n is a small number, typically about 1–4.

While the X values in formula II may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of formula IV (reagent A-2) include diols and thiol analogs thereof having divalent radicals of formula II which are identical to or different from the corresponding divalent radicals in the compound of formula III, as well as other dihydroxyaromatic compounds and thiol analogs thereof. When such bis(active hydrogen) compounds (or their alkali metal salts) are present, they generally comprise up to about 50%, most often up to about 20% and preferably up to about 10%, of reagent A.

Most preferably, reagent A consists essentially of reagent A-1 or of a mixture of reagents A-1 and A-2 containing the same R value, as noted hereinafter. Any cyclic oligomers containing divalent aliphatic radicals (or their vinylogs) flanked by two oxygen atoms are prepared by using a mixture of compounds identifiable as reagent A-1.

The bischloroformate may be employed in substantially pure, isolated form. It is frequently preferred, however, to use a crude bischloroformate product. Suitable crude products may be prepared by any known methods for bischloroformate preparation. Typically, at least one bisphenol is reacted with phosgene in the presence of a substantially inert organic liquid, as disclosed in the following United States patents:

U.S. Pat. No. 3,255,230,
U.S. Pat. No. 3,312,661,
U.S. Pat. No. 3,966,785,
U.S. Pat. No. 3,974,126.

The disclosures of these patents are incorporated by reference herein.

In addition to the bisphenol bischloroformate, such crude bischloroformate products may contain oligomer bischloroformates. Most often, a major proportion of the crude product comprises monomer, dimer and trimer bischloroformate. Higher oligomer bischloroformates, and monochloroformates corresponding to any of the aforementioned bischloroformates, may also be present, preferably only in relatively small amounts.

More preferably, the preparation of the crude bischloroformate product takes place in the presence of aqueous alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by the method disclosed in copending, commonly owned application Ser. No. 790,909, filed Feb. 24, 1985, now U.S. Pat. No. 4,638,077, the disclosure of which is also incorporated by reference herein. In that method, phosgene is passed into a mixture of a substantially inert organic liquid and a bisphenol, said mixture being maintained at a temperature within the range of about 10°–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH in the range of about 0.5–0.8. By this method, it is possible to prepare bischloroformate in high yield while using a relatively small proportion of phosgene, typically up to about 1.1 equivalent per equivalent of bisphenol.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines useful as reagent B ("tertiary" in this context denoting the absence of N-H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purpose of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic oligomer mixture. For the most part, such amines contain at least about 6 and preferably about 6–14 carbon atoms.

The amines most useful as reagent B are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali or alkaline earth metal hydroxide or carbonate solution, such as lithium, sodium, potassium or calcium hydroxide or sodium or potassium carbonate. It is most often lithium, sodium or potassium hydroxide, with sodium hydroxide being preferred because of its availability and relatively low cost. The concentration of the solution is not critical and may be about 0.1–16M.

The fourth essential component (component D) in the cyclic oligomer preparation method of this invention is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer mixture according to the above-described method, in step I the reagents and components are maintained in contact under conditions whereby reagent A is present in low concentration. Actual high dilution conditions, requiring a large proportion of component D, may be employed but are usually not preferred for cost and convenience reasons. Instead, simulated high dilution conditions known to those skilled in the art may be employed. For example, in one embodiment of the method reagent A (and optionally other reagents) are added gradually to a reaction vessel containing solvent.

Although addition of reagent A neat (i.e., without solvents) is within the scope of this embodiment, it is frequently inconvenient because many bischloroformates are solids. Therefore, it is preferably added as a solution in a portion of component D, especially when it consists essentially of reagent A-1. The proportion of component D used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 1.5 mole of reagent A, calculated as bisphenol bischloroformate (and bisphenol or salt thereof if present), per liter of component D in the reaction system, including any liquid used to dissolve reagent A. Preferably, about 0.003–1.0 mole of reagent A is used when it consists entirely of reagent A-1, and no more than about 0.5 mole is used when it is a mixture of reagents A-1 and A-2. It should be noted that this is not a molar concentration in component D when reagent A is added gradually, since said reagent is consumed as it is added to the reaction system.

The molar proportions of the reagents constitute another important feature for yield and purity maximization. The preferred molar ratio of reagent B to reagent A-1 used alone (calculated as bisphenol bischloroformate) is about 0.1–1.0:1 and most often about 0.15–0.6:1, and that of reagent C is reagent A-1 used alone is about 1.5–3:1 and most often about 2–3:1. When a combination of reagents A-1 and A-2 is used, the preferred molar ratio for reagent B is about 0.1–0.5:1. The preferred ratio for reagent C is the same as above, including any alkali metal hydroxide used to form an alkali metal salt used as reagent A-2.

The use of reagent A-2 comprising a bisphenol alkali metal salt is of particular value when it is desired to minimize the amount of phosgene required for overall production of cyclic polycarbonates. When reagent A-1 alone is used, half the phosgene used for bischloroformate formation is lost by hydrolysis upon conversion of the bischloroformate to cyclics. On the other hand, each chloroformate moiety can theoretically react with a bisphenol salt moiety to form a carbonate group if the latter is present in sufficient amount. It is also frequently found that the proportion of cyclic dimer in the product is maximized by use of reagent A-2.

In practice, it is generally found that incorporation of reagent A-2 into cyclics under these conditions is incomplete. Thus, removal of any unreacted bisphenol as its alkali metal salt is usually necessary.

Step II of the cyclic oligomer preparation method is the separation of the oligomer mixture from at least a portion of the high polymer and insoluble material present. When other reagents are added to reagent C and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions described hereinafter are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using as reagent B at least one aliphatic or heterocyclic tertiary amine which, under the reaction conditions, dissolves preferentially in the organic phase of the reaction system, and gradually adding reagent A and at least a portion of reagents B and C simultaneously to a substantially non-polar organic liquid (component D) or to a mixture of said liquid with water, said liquid or mixture being maintained at a temperature in the range of about 0°–50° C.; the amount of reagent A used being up to about 0.7 mole for each liter of component D present in the reaction system, and the total molar proportions of reagents A, B and C being approximately as follows:

B:A—0.06–2.0:1
C:A—2–3:1;

and recovering the cyclic oligomers thus formed.

A factor of some importance in this embodiment is the concentration of available reagent B, which should be maintained at a level as constant as possible during the entire addition period for reagent A-1. If all of reagents B is present in the reaction vessel into which reagent A-1 is introduced, its concentration steadily decreases, principally by dilution. On the other hand, if reagent B is introduced continuously or in equal increments during introduction of reagent A-1, its available concentration is initially low and increases more or less steadily during the addition period. These fluctuations can result in a high and constantly varying proportion of high polymer in the product.

When reagent A-2 is employed in this embodiment, cyclics yield is usually optimized if said reagent is absent from the portion of reagent A added near the end of the reaction. In other words, it is often preferred that any batch be terminated by a period of addition of reagent A consisting essentially of reagent A-1.

It has been found advantageous to introduce reagent B in one initial large portion, usually about 40–95% and preferably about 40–75% by weight of the total amount, followed by incremental or continuous addition of the balance thereof. By this procedure, the concentration of available reagent B is maintained at a fairly constant level in the organic phase during the entire addition period, and it is possible to minimize the proportion of high polymer in the product. Typically, high polymer content is 10% or less when this mode of addition is used.

Under these conditions, it is usually advantageous for the reaction vessel to initially contain about 5–40% and preferably about 5–30% of total reagent C. The balance thereof is also introduced continuously or incrementally. As in the embodiment previously described, another portion of component D may serve as a solvent for reagent A.

Among the other principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

In this preferred embodiment, the pH of the reaction mixture is typically in the range of about 9–14 and preferably about 12. When reagent A (and optionally reagent B) is added to all of the reagent C, on the other hand, the initial pH remains on the order of 14 during essentially the entire reaction period.

When step II is necessary, the unwanted impurities may be removed in the necessary amounts by conventional operations such as combining the crude product, as a solid or in solution, with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The distributions of the molecular species in polycarbonate oligomer products obtained by the method of this invention have been proved by reversed phase high pressure liquid chromatography. The product was dissolved in a mixture of tetrahydrofuran and water and chromatographed using a relatively non-polar packing, whereupon more polar constituents including linear oligomers were eluted first, followed by cyclic oligomers of progressively increasing degrees of polymerization and, finally, high polymer. For each molecular species, two values were determined and used for identification: the retention time (in minutes) and the "254/280 value". The latter is defined as the ratio of the areas under the ultraviolet absorption peaks at 254 and 280 nm. Both of these wavelengths are characteristic of compounds of this type, and the 254/280 values for individual oligomers are uniquely identifiable.

The standards used for assignment of retention time and 254/280 value were separately prepared linear and cyclic polycarbonate oligomers of bisphenol A having degrees of polymerization of 2–5 and 3–6, respectively. The linear dimer was prepared by protecting one bisphenol A hydroxy group with a triethylsilyl moiety by reaction with triethylsilyl chloride, reacting two moles of the protected molecule with one mole of phosgene, and removing the protective moiety under acidic conditions. The linear trimer was prepared by a similar reaction in which bisphenol A bischloroformate was substituted for the phosgene. Reaction of one mole of the dimer and trimer with two moles of the monochloroformate of the protected bisphenol A, followed by removal of the protective moiety, yielded the linear oligomers with degrees of polymerization of 4 and 5, respectively. Each of these linear oligomers was then reacted with bisphenol A bischloroformate at high dilution to produce the cyclic oligomer having the next higher degree of polymerization.

By comparison with said separately prepared compounds, the cyclic bisphenol A polycarbonate oligomer mixtures of the present invention have been shown to contain oligomers having degrees of polymerization from 2 to 12, including substantially all of those from 2 to 6, with about 50–70% (by weight) thereof being in the range from 2 to 5. It is generally preferred to use said mixtures as prepared, or optionally with separation of high polymer and/or insolubles. It is frequently possible, however, to isolate individual oligomers in substantially pure form by fractional precipitation techniques. For example, cyclic bisphenol A carbonate tetramer may be isolated by the successive steps of precipitating high polymer by precipitation with acetone, removing oligomers of high degree of polymerization by dissolution in a 20% (by volume) solution of acetone in hexane, extracting the residue with a 60% (by volume) solution of acetone in hexane, and refrigerating the extracts to precipitate the tetramer.

Upon extraction and refrigeration a second time, there is obtained cyclic bisphenol A carbonate dimer. The presence of similar dimers in cyclic oligomer mixtures from other bisphenols was shown by chromatographic comparison with known linear oligomers endcapped with diphenyl carbonate. Substantial amounts of weight average molecular weights of the cyclic oligomer mixtures were approximately 1300, corresponding to an average degree of polymerization of about 5.1.

TABLE 1

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
|---|---|---|---|---|---|---|---|
| 1 | 100 | 2 | 0.313 | 0.5 | 20 | 30 | 97 |
| 2 | 100 | 2 | 0.625 | 0.5 | 20 | 30 | 95 |
| 3 | 100 | 2 | 2.5 | 0.5 | 35 | 55 | 93 |
| 4 | 100 | 2 | 2.5 | 0.5 | 0 | 30 | 77 |
| 5 | 100 | 2 | 2.5 | 0.5 | 20 | 30 | 87 |
| 6 | 100 | 2 | 2.5 | 0.5 | 35 | 30 | 78 |
| 7 | 100 | 2 | 2.5 | 0.5 | 50 | 30 | 88 |
| 8 | 100 | 2 | 2.5 | 0.25 | 20 | 30 | 74 |
| 9 | 100 | 1 | 2.5 | 0.2 | 20 | 15 | 75 |
| 10 | 200 | 4 | 2.5 | 0.5 | 20 | 30 | 88 |
| 11 | 500 | 10 | 2.5 | 0.25 | 25 | 105 | 83 |
| 12 | 500 | 10 | 2.5 | 0.25 | 25 | 105 | 78 |
| 13 | 500 | 10 | 2.5 | 0.25 | 25 | 105 | 83 |
| 14 | 500 | 10 | 2.5 | 0.25 | 25 | 105 | 87 |
| 15 | 500 | 10 | 2.5 | 0.29 | 30 | 90 | 78 |
| 16 | 500 | 10 | 2.5 | 0.25 | 30 | 20 | 75 |
| 17 | 500 | 10 | 2.5 | 0.25 | 40–45 | 105 | 79 |
| 18 | 500 | 10 | 2.5 | 0.4 | 25 | 105 | 79 | cyclic carbonate dimers also appear in mixtures prepared from chloroformates of other bisphenols having meta and/or para configurations. These dimers are of particular interest because of their rapid rates of polymerization by methods described hereinafter, either alone or more particularly in combination with the other oligomers in the mixture.

The preparation of cyclic oligomer mixtures of this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES 1–18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradully, with slow stirring, to the balance of the reaction mixture. In Examples 1–10 and 12, the triethylamine was all originally present in the reaction vessel; in Examples 14–16, it was added gradually at the same time as the bischloroformate; and in Examples 11, 13, 17 and 18, it was added in equal increments at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymer was precipitated by addition of acetone.

The reaction conditions for Examples 1–18 are listed in Table I together with the approximate percentage (by weight) of cyclic polycarbonate oligomer present in the product before high polymer precipitation. The

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

EXAMPLE 20

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene-1,4-dimethanol.

EXAMPLES 21–32

Following the procedure of Example 20, products containing at least about 80% mixed cyclic polycarbonate oligomers were prepared from mixtures of bisphenol A bischloroformate and the dihydroxy compounds or dithiols listed in Table II. In each case, a total of 2 mmol. of reagent A was used. The proportion of the listed dihydroxy compound or dithiol was 10 mole percent unless otherwise indicated.

TABLE II

| Example | Dihydroxy compound or dithiol |
|---|---|
| 21 | 1,1-Bis(4-hydroxyphenyl)cyclohexane |
| 22 | 1,1-Bis(4-hydroxyphenyl)cyclododecane |
| 23 | 2,2-Bis(3,5-dimethyl-4-hydroxyphenyl)propane |
| 24 | 2,2-Bis(3,5-dibromo-4-hydroxyphenyl)propane |
| 25 | 2,2-Bis(4-hydroxyphenyl)-1,1-dichloroethylene |

TABLE II-continued

| Example | Dihydroxy compound or dithiol |
|---|---|
| 26 | Hydroquinone |
| 27 | Hydroquinone (15 mole percent) |
| 28 | Bis(4-hydroxyphenyl) sulfide |
| 29 | Bis(4-hydroxyphenyl) sulfone |
| 30 | Bis(3,5-dimethyl-4-hydroxyphenyl) sulfone |
| 31 | 4,4'-Biphenyldithiol |
| 32 | 1,12-Dodecanedithiol |

EXAMPLE 33

A solution of 3.10 mmol. of bisphenol A bischloroformate and 0.3 mmol. of bis(2-hydroxyphenyl)methane in 10 ml. of methylene chloride was added over 30 minutes at 25°, with stirring, to a mixture of 10 ml. of methylene chloride, 2 ml. of 2.5M aqueous sodium hydroxide and 0.5 mmol. of triethylamine. After addition was complete, the mixture was worked up as described in Examples 1-18. The product was the desired mixed cyclic polycarbonate oligomer of bisphenol A and bis(2-hydroxyphenyl)methane.

EXAMPLE 34

A mixture of 45.66 grams (200 mmol.) of bisphenol A and 200 ml. of methylene chloride was stirred as gaseous phosgene was passed in for 50 minutes at 0.83 grams per minute (total 420 mmol.). At the same time, 88 ml. of 5M aqueous sodium hydroxide (440 mmol.) was added incrementally to maintain the pH above 10.0. Stirring was continued for 15 minutes, after which the methylene chloride solution of the crude bischloroformate product was separated and washed with 0.1M aqueous hydrochloric acid.

The crude bischloroformate product was added over one hour, with slow stirring, to a mixture of 200 ml. of 5M aqueous sodium hydroxide (1 mole) and 300 ml. of methylene chloride in a Morton flask. There was simultaneously added a solution of 5.05 grams (50 mmol.) of triethylamine in 20 ml. of methylene chloride. Stirring was continued for 15 minutes, after which the mixture was quenched by adding 3M aqueous hydrochloric acid to a pH of 3. The organic layer was washed twice with aqueous hydrochloric acid, dried over magnesium sulfate and vacuum stripped. There was obtained 48.94 grams of a white solid which was shown by high pressure liquid-liquid chromatography to comprise about 80% cyclic polycarbonate oligomers.

EXAMPLE 35

A crude bisphenol A bischloroformate product was employed which was analyzed as follows:

| Monomer bischloroformate | 23% |
|---|---|
| Dimer bischloroformate | 19% |
| Trimer bischloroformate | 17% |
| Tetramer, pentamer and hexamer bischloroformates | 29% | and had an average degree of polymerization of about 2.9. An amount thereof containing 800 mmol. of monomer to hexamer bischloroformates, calculated as monomer bischloroformate, dissolved in one-half the total amount of methylene chloride used, was added over 34 minutes, with stirring, to a reaction vessel containing 450 ml. of 5M aqueous sodium hydroxide and the balance of the methylene chloride. The total amount of bischloroformate was 400 mmol. per liter of methylene chloride. Triethylamine, 200 mmol., was added in equal increments at intervals of 25% during bischloroformate addition. The peak reaction temperature was 37°. Upon workup as in Examples 1-18, there was obtained a product comprising 69% cyclic polycarbonate oligomers.

EXAMPLE 36

A crude bisphenol A bischloroformate product prepared by a method similar to that of Example 35, except that the pH was maintained below 8, was analyzed as follows:

| Monomer bischloroformate | 58% |
|---|---|
| Dimer bischloroformate | 26% |
| Trimer bischloroformate | 10% | and had an average degree of polymerization of about 1.5. Amounts of methylene chloride solution of said product and aqueous sodium hydroxide solution identical to those used in Example 35 were added over 37 minutes, with stirring, to the remainder of the methylene chloride. Triethylamine, 200 mmol., was added incrementally as in Example 35. The peak reaction temperature was 40°. Upon workup, there was obtained a product comprising 82% cyclic polycarbonate oligomer.

EXAMPLES 37-39

Bisphenol A bischloroformate, 10 mmol., was added as described in Example 34, over 105 minutes, to a mixture of methylene chloride and 5.6 ml. of 5M aqueous sodium hydroxide solution. Triethylamine, 2.5 mmol., was also introduced in various ways. The reaction mixture was worked up and analyzed as described in Examples 1-18. The results are given in Table III.

TABLE III

| Example | Mode of triethylamine addition | % cyclic oligomers |
|---|---|---|
| 37 | Present in reaction vessel | 72 |
| 38 | Added in equal increments at 20% intervals | 79 |
| 39 | Added continuously | 87 |

EXAMPLE 40

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux, with stirring, as 40 ml. of a 1.06M solution of the bischloroformate in methylene chloride was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

EXAMPLES 41-44

A 300-ml. Morton flask was charged with 72 ml. of methylene chloride, 10 ml. of water, 0.5 ml. of 50% aqueous sodium hydroxide solution and various quantities of triethylamine. The mixture was heated to reflux with stirring and 40 ml. of the crude bischloroformate solution of Example 40 was added over 37 minutes. There were also added 5 ml. of 50% aqueous sodium hydroxide over 30 minutes and triethylamine in 10 equal portions at 3½-minute intervals. Upon workup and recovery as in Example 40, there were obtained the desired cyclic bisphenol A polycarbonate oligomer mixtures.

The relevant parameters and amounts of high polymer detected at various intervals are listed in Table IV. The "Concentration" figures are in mililiters per liter of methylene chloride. Comparison was made with control A in which all of the triethylamine was added to the flask at the beginning of the reaction, and control B in which triethylamine was added in 5 equally spaced increments at the beginning and during the course of the reaction.

TABLE IV

| | | Triethylamine | | % cyclic oligomers | | |
|---|---|---|---|---|---|---|
| | | Initial | Each Subsequent | | | |
| Example | Concentration | addn., ml. | addn., ml. | 5 min. | 18 min. | 37 min. |
| 41 | 6.5 | 0.47 | 0.024 | 91.5 | 89.8 | 89.5 |
| 42 | 9.0 | 0.65 | 0.036 | 92.5 | 90.8 | 91.9 |
| 43 | 12.1 | 0.87 | 0.049 | 91.0 | 93.0 | 91.5 |
| 44 | 15.1 | 1.09 | 0.062 | 89.3 | 89.8 | 90.8 |
| Control A | — | 1.36 | — | 82.1 | — | 87.0 |
| Control B | — | 0.36 | 0.36 | 84.5 | 87.4 | 86.8 |

EXAMPLE 45-48

To mixtures of 56 ml. of methylene chloride, 0.49 gram of triethylamine and various amounts of aqueous base were added over 30 minutes under reflux, with stirring, 40 ml. of a crude bisphenol A bischloroformate solution in methylene chloride similar to those of Examples 35-36, 1.06M in bisphenol moieties. An additional 0.36 gram of triethylamine was added in 10 equal increments every 3 minutes, and in some examples additional aqueous base was added continuously. The total base employed was 2.5 equivalents per bisphenol moiety. The products were analyzed by high pressure liquid chromatography. The relevant parameters are given in Table V.

TABLE V

| | Example | | | |
|---|---|---|---|---|
| | 45 | 46 | 47 | 48 |
| Base: | | | | |
| Identity | KOH | LiOH.H$_2$O | K$_2$CO$_3$ | Ca(OH)$_2$ |
| Amt. initially present | 0.5 ml.* | 4.5 g. | 14.6 g. | 7.9 g. |
| Amt. subsequently added | 8.2 ml.* | — | — | — |
| Water: | | | | |
| Amt. initially present | 8 ml. | 25 ml. | 25 ml. | 30 ml. |
| Amt. subsequently added | * | — | — | — |
| Cyclic oligomers in product, % | 86 | 86.5 | 83.3 | 88 |

*45% aqueous KOH solution employed.

EXAMPLES 49-80

Following substantially the procedure of Example 42, cyclic homo- and copolycarbonates of the dihydroxy compounds listed in Table VI were prepared. Unless otherwise indicated, reagent A contained 90 mole percent bisphenol A bischloroformate and 10 mole percent of the listed bisphenol.

TABLE VI

| Example | Dihydroxy compound |
|---|---|
| 49 | 2,2-Bis(4-hydroxyphenyl)hexafluoropropane (100 mole %) |
| 50 | 1,1-Bis(4-hydroxyphenyl)cyclohexane (100 mole %) |
| 51 | 1,1-Bis(4-hydroxyphenyl)cyclododecane (100 mole %) |
| 52 | 1,1-Dichloro-2,2-bis(4-hydroxyphenyl)ethylene (100 mole %) |
| 53 | Bis(4-hydroxyphenyl) sulfide (100 mole %) |
| 54 | 2-(4-hydroxyphenyl)-2-(3-hydroxyphenyl)-propane (100 mole %) |
| 55 | 1,1-Bis(4-hydroxyphenyl)cyclododecane |
| 56 | 1,1-Bis(4-hydroxyphenyl)cyclohexane |
| 57 | Bis(4-hydroxyphenyl) sulfone |
| 58 | 3,3-Bis(4-hydroxyphenyl)phthalide |
| 59 | 2,2-Bis(3-allyl-4-hydroxyphenyl)propane |
| 60 | 2,2-Bis(4-hydroxyphenyl)hexafluoropropane |
| 61 | 2,2-Bis(3,5-dimethyl-4-hydroxyphenyl)propane |
| 62 | 2,2-Bis(3,5-dibromo-4-hydroxyphenyl)propane |
| 63 | 2,2-Bis(3-methyl-4-hydroxyphenyl)propane |
| 64 | Bis(4-hydroxyphenyl)methane |
| 65 | α,α-Bis(4-hydroxyphenyl)toluene |
| 66 | 2,2-Bis(4-hydroxyphenyl)diphenylmethane |
| 67 | Bis(3,5-dimethyl-4-hydroxyphenyl) sulfone |
| 68 | 4,4'-Dihydroxybenzophenone |
| 69 | 2,2-Bis(3-ethyl-4-hydroxyphenyl)propane |
| 70 | 2,2-Bis(3-n-propyl-4-hydroxyphenyl)propane |
| 71 | 2,2-Bis(3-isopropyl-4-hydroxyphenyl)propane |
| 72 | 2,2-Bis(3-sec-butyl-4-hydroxyphenyl)propane |
| 73 | 2,2-Bis(3-t-butyl-4-hydroxyphenyl)propane |
| 74 | 2,2-Bis(3-cyclohexyl-4-hydroxyphenyl)propane |
| 75 | Hydroquinone |
| 76 | 4-Bromoresorcinol |
| 77 | Resorcinol |
| 78 | 4,4'-Dihydroxybiphenyl |
| 79 | Bis(4-hydroxyphenyl)benzophenone |
| 80 | 2-(3-allyl-4-hydroxyphenyl)-2-(4-hydroxyphenyl)propane |

EXAMPLE 81

A mixture of 31.7 grams (100 mmol.) of spirobiindane bisphenol, 30 grams (200 mmol.) of N,N-diethylaniline and 500 ml. of methylene chloride was cooled to −10° C. with stirring. Phosgene was bubbled through the solution at 3 grams per minute for 10 minutes (total 300 mmol.). Stirring was continued as the mixture was allowed to warm slowly to room temperature over 2 hours. It was warmed in a water bath and sparged with nitrogen to evaporate about half the methylene chloride, diluted with an equal volume of hexane and washed three times with dilute aqueous hydrochloric acid and once with water. The organic layer was filtered and vacuum stripped, and the resulting oil was dissolved in petroleum ether and filtered. Upon stripping of the petroleum ether, the desired spirobiindane bisphenol bischloroformate was obtained; it comprised about 90% monomer bischloroformate.

A mixture of 80 ml. of methylene chloride, 10 ml. of water, 0.5 ml. of 50% aqueous sodium hydroxide and 0.51 ml. of triethylamine was heated to reflux with stirring. There was added over 30 minutes, with continued stirring, 50 ml. of a 1M solution in methylene chloride of equimolar proportions of bisphenol A bischloroformate and spirobiindane bisphenol bischloroformate. At the same time, 5 ml. of 50% aqueous sodium hydroxide and 0.525 ml. of triethylamine were added in 5 increments at 5-minute intervals. When the addition was complete, the organic and aqueous layers were separated and the aqueous layer was washed with methylene chloride. The combined organic phases were washed three times with dilute aqueous hydrochloric acid and once with water, filtered and vacuum stripped to yield the desired mixed cyclic polycarbonate oligomers.

EXAMPLE 82

Phosgene was passed at 1 gram per minute into a mixture of 15.85 grams (50 mmol.) of spirobiindane bisphenol, 10 ml. of 2.5M aqueous sodium hydroxide and 100 ml. of methylene chloride until a clear solution was obtained, at which point the pH dropped below 7. Phosgene passage was continued for a total of 12 minutes at a pH in the range of 4-6. The crude spirobiindane bisphenol bischloroformate composition was isolated as in Example 81; it was found to contain about 43% monomer bischloroformate and about 8% dimer bischloroformate.

Following the procedure of Example 81, a cyclic spirobiindane bisphenol homopolycarbonate mixture was prepared from the crude bischloroformate.

The cyclic oligomer mixtures of this invention are useful as intermediates for conversion to polycarbonates or their thiol analogs. Accordingly, the present invention includes a method for the preparation of a resinous composition which comprises contacting at least one of the previously defined cyclic oligomer mixtures with a polycarbonate formation catalyst at a temperature up to about 350° C. The oligomer mixtures may frequently be employed in this method without separation of high polymer therefrom, but if desired, high polymer may be removed as previously described.

Previously known methods for forming (e.g., molding) polycarbonates are often cumbersome because of the high viscosities of the polycarbonates. On the other hand, it has not been possible to integrate preparation methods involving the use of phosgene or various monomeric esters with forming operations because of the presence of volatile solvents such as methylene chloride or by-products such as phenol, during or after polymerization. By contrast, the cyclic oligomer mixtures of this invention are liquid and have low viscosities. (Typical Brookfield viscosity values at 215° C. are below 20,000 centipoises.) Moreover, they are substantially non-volatile at resin formation temperatures. Thus, it is possible to integrate resin formation therefrom with such forming operations.

For example, the cyclic oligomer mixtures may be polymerized during extrusion or molding operations, upon raising their temperature to conventional extrusion or molding temperatures. Molding and simultaneous polymerization may be achieved by several known techniques, including injection molding and rotational molding. These methods, and the application of heat during extrusion or to the molded articles produced thereby, constitute other embodiments of the invention.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

A particularly useful class of Lewis bases is disclosed in copending, commonly owned application Ser. No. 723,672, filed Apr. 16, 1985, now U.S. Pat. No. 4,605,731. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl)titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The resin formation reaction is typically effected by simply contacting the cyclic oligomer mixture with the catalyst at temperatures up to 350° C., preferably about 200°–300° C., until polymerization has proceeded to the extent desired. Although the use of a solvent is within the scope of the invention, it is generally not preferred. In general, the amount of catalyst used is about 0.001–1.0 mole percent based on structural units in the oligomer mixture.

Resinous compositions of various structures may be prepared by the use of various cyclic oligomer mixtures. The available options are numerous because the resins obtained from cyclic oligomer mixtures are "living" polymers. Thus, the use of oligomer mixtures prepared from a single material such as bisphenol A chloroformate affords homopolycarbonates. Random copolycarbonates may be obtained by using oligomers prepared from a mixture of reagents A-1 and A-2 containing different R values, from a mixture of two or more species of reagent A-1, or from blends of two or more different oligomer mixtures. The preparation of block copolycarbonates may be effected, for example, by reacting a bisphenol A cyclic oligomer mixture with a cyclic oligomer mixture derived from another bisphenol such as 2,2-bis(4-hydroxyphenyl)-1,1-dichloroethylene and controlling the time of addition. If desired, one or both mixtures may be prepolymerized before combining them.

When at least a portion of the R and especially the $A^1$ and/or $A^2$ moieties in the cyclic molecule contain olefinic substituents such as vinyl or allyl, a free radical polymerization reaction is possible which can result in the formation of crosslinked polycarbonates or polycarbonate graft copolymers. Under proper conditions, the polycarbonate-forming and free radical reactions can be independently initiated in any desired order. For example, a suitable organophilic free radical initiator such as dicumyl peroxide or benzoyl peroxide may be introduced during or after the polycarbonate-forming reaction to initiate subsequent crosslinking. Conversely, free radical polymerization may precede polycarbonate formation if the order of the catalyst/initiator addition is reversed.

Another possibility is the formation of a cyclic oligomer mixture containing about 50 mole percent of (for example) bisphenol A units and about 50% of sterically hindered units which will not condense with themselves, illustrated by 2,2-bis(3,5-dimethyl-4-hydroxyphenyl)propane. The resulting cyclic mixtures contain alternating bisphenol A and sterically hindered units, and may be converted to alternating copolycarbonates.

The conditions of the polymerization reaction may be varied to produce resinous compositions of various molecular weights and molecular weight distributions (i.e., Mw/Mn ratios), including resins having properties substantially the same as those of commercial bisphenol A polycarbonates. Molecular weight can be controlled by varying the amount of catalyst, with a decrease in said amount generally resulting in an increase in molecular weight, or by employing known chain transfer agents, of which diphenyl carbonate is an example, typically in amounts up to about 2.5 mole percent based on structural units in the oligomer mixture. It is also possible to produce resins having very low molecular weight distributions (i.e., Mw/Mn ratios), frequently approaching or lower than 2.0.

The resin preparation method of this invention may be used to produce polymers of very high molecular weights, particularly when no chain transfer agents are used. Values above 250,000 are readily attainable. Under certain conditions, resins with molecular weights in the 600,000–700,000 range, or even higher, may be prepared. While high molecular weight polycarbonates of this type are known, they have previously been of little commercial use because of their intractability under normal processing conditions. This property is irrelevant, however, when the cyclic oligomer mixtures of the present invention are used as polycarbonate precursors since said mixtures can be simultaneously polymerized and processed to produce articles which are very tough and resistant to severe temperature and solvent conditions.

Among the processing operations which can be conducted simultaneously with polymerization are various extrusion and molding operations. Thus, the cyclic oligomer mixtures may be combined with polycarbonate formation catalysts of the type described hereinabove and fed to an extruder which is maintained at polymerization temperature. The effluent from the extruder is then a polycarbonate in the desired sheet, rod or other form. The molecular weight of the product may be adjusted over a wide range by methods previously described.

Similarly, the cyclic oligomer mixtures may be combined with polycarbonate formation catalysts and injection molded at polymerization temperatures. Said mixtures also have flow properties adequate for rotational molding simultaneous with polymerization. These capabilities make it possible to employ the cyclic oligomer mixtures of this invention in operations previously unavailable with respect to polycarbonates.

Under certain conditions of simultaneous processing and polymerization, it may be desirable to facilitate flow of the oligomer mixture before polymerization occurs to a substantial degree. This is particularly useful in rotational molding operations. For this purpose, it is frequently advantageous to incorporate the polycarbonate formation catalyst in a concentrate having higher viscosity then the balance of the oligomer mixture. For example, the major proportion of the oligomer mixture may be separated from high polymer as previously described, and the catalyst concentrate may be prepared from a mixture still containing high polymer.

Upon combining the major proportion of the oligomer mixture with the catalyst concentrate under non-reactive conditions, typically by dry blending of solids, there is obtained a material in which the catalyst is essentially encapsulated in a relatively high viscosity component. Upon heating, the portion of the mixture which is free of catalyst, being lower in viscosity, will melt and flow first. Thus, adequate flow within the mold can be achieved before the catalyst contacts the cyclics to an extent which promotes rapid polymerization.

Individual cyclic oligomers (for example, the dimer, trimer or tetramer) may be polymerized by similar procedures. Their use as polymer intermediates is generally not preferred, because their generally high melting points necessitate the use of solvents. However, it has been discovered that the rate of polymerization of cyclic bisphenol A carbonate dimer is much higher than those of the corresponding trimer, tetramer or oligomer mixture. For example, under identical conditions of polymerization in 2,4-dichlorotoluene, the dimer was essentially completely polymerized in less than one hour, compared to 2–3 hours for the trimer and tetramer and a substantially more gradual reaction for the oligomer mixture. It is therefore frequently advantageous to maximize, as possible, the proportion of dimer in said mixture.

The preparation of polycarbonates from the cyclic oligomer mixture of this invention is illustrated by the following examples. Intrinsic viscosities (IV) were determined in chloroform at 25° C.

EXAMPLES 83–88

A crude cyclic bisphenol A polycarbonate oligomer mixture, having a weight average molecular weight of about 1340, prepared by a method similar to that of Examples 1–18 (excluding dissolution in tetrahydrofuran for chromatography purposes) but still containing the high polymer constituents, was heated under nitrogen at 300° C. and a solution of catalyst in methylene chloride was added after about 3 minutes. In Examples 85-87, diphenyl carbonate was added to the oligomer mixture as a chain transfer agent. Polymerization was allowed to continue for 10 minutes, after which the polycarbonate was removed, dissolved in methylene chloride, filtered and precipitated by the addition of methanol. The weight average molecular weight, intrinsic viscosity and glass transition temperature (Tg) were also determined. The relevant parameters and results are given in Table VII.

TABLE VII

| Example | Catalyst Identity | Catalyst Mole % | Diphenyl carbonate mole % | Mw | IV dl/g. | Tg, °C. |
|---|---|---|---|---|---|---|
| 83 | Lithium stearate | 0.1 | — | 300,000* | — | — |
| 84 | "Tyzor AA" | 0.01 | — | 265,000 | — | — |
| 85 | " | 0.002 | — | 269,000 | — | — |
| 86 | " | 0.002 | 1.0 | 117,000 | 0.646 | 157 |
| 87 | " | 0.002 | 1.5 | 141,000 | 0.903 | 152 |
| 88 | " | 0.002 | 2.0 | 65,300 | — | — |

*Minimum value; 300,000 is highest figure determinable on apparatus used.

EXAMPLES 89-94

Various catalysts were thoroughly mixed, in a nitrogen atmosphere, with a cyclic bisphenol A polycarbonate oligomer mixture similar to that of Examples 83-88 but having a molecular weight of about 2600. In Examples 89 and 91, the catalysts were added as 0.1M solutions in toluene. The mixtures were heated under nitrogen at 250° C. for three hours, after which the polycarbonates produced were dissolved in methylene chloride, precipitated by pouring into methanol and dried. The relevant parameters and results are given in Table VIII.

TABLE VIII

| Example | Catalyst Identity | Mole % | Mw of polymer |
|---|---|---|---|
| 89 | "Tyzor AA" | 0.075 | 194,000 |
| 90 | Lithium 2,2,2-trifluoroethoxide | 0.080 | 37,020 |
| 91 | Bisisopropoxyaluminum salt of ethyl acetoacetate | 0.075 | 175,800 |
| 92 | Sodium benzoate | 0.071 | 258,000 |
| 93 | Dioctyltin oxide | 0.210 | 106,700 |
| 94 | Lithium stearate | 0.099 | 42,890 |

EXAMPLES 95-101

Blends of catalyst and the cyclic bisphenol A polycarbonate oligomer mixture used in Examples 89-94 were prepared. In Examples 95-98, blending was achieved by dissolving oligomers and catalyst in dry methylene chloride, mixing and evaporating the solvent; in Examples 99-101, by thoroughly grinding together solid oligomer and catalyst. A 2-gram sample of each blend was charged to a circular mold having an inside diameter of 1 inch (2.54 cm.), which had been preheated to 250° C. The mold was closed and heated at 250° C. for 3 minutes without applied pressure and for an additional time under a force of 2 tons (1.8 metric tons). It was then opened and the polycarbonate disk was removed. It was homogeneous, tough and could not be broken by bending.

A portion of each disk was dissolved in methylene chloride and weight and number average molecular weights were determined. The results and other relevant parameters are given in Table IX.

TABLE IX

| Example | Identity | Mole % | time, min. | Mw | Mw/Mn |
|---|---|---|---|---|---|
| 95 | "Tyzor AA" | 0.075 | 30 | 169,000 | 2.7 |
| 96 | " | 0.040 | 30 | 248,700 | 2.2 |
| 97 | " | 0.040 | 15 | 265,400 | 2.05 |
| 98 | Bisisopropoxyaluminum salt of ethyl acetoacetate | 0.075 | 30 | 282,200 | 2.5 |
| 99 | Sodium benzoate | 0.500 | 30 | 222,700 | 12.7 |
| 100 | Dioctyltin oxide | 0.153 | 30 | 118,900 | 20.3 |
| 101 | Lithium stearate | 0.239 | 30 | 60,190 | 2.5 |

EXAMPLES 102-103

Solutions of one gram of the cyclic oligomer mixtures of Examples 22 and 29 and 0.025 mole percent (based on oligomer mixture) of "Tyzor AA" in 20 ml. of o-dichlorobenzene were heated under reflux for 10 hours in a nitrogen atmosphere. The resulting polycarbonates were precipitated by pouring the solution into methanol, dissolved in chloroform and reprecipitated by pouring into acetone. The results are given in Table X.

TABLE X

| Example | Oligomer mixture of Example | Mw | Mw/Mn | Tg, °C. |
|---|---|---|---|---|
| 102 | 22 | 74,960 | 2.11 | 176 |
| 103 | 29 | 34,230 | 2.11 | 164 |

EXAMPLE 104

A solution of 5 grams of the cyclic oligomer mixture of Example 27 and 0.1 mole percent of "Tyzor AA" is evaporated to dryness under vacuum, and the resulting blend is dried in a vacuum oven at 80° C. for 10 hours. A sample of the blend is heated under nitrogen at 250° C. for 2 hours. The resulting polymer is dissolved in methylene cloride, precipitated by pouring into methanol, redissolved and reprecipitated by pouring into acetone. It has a molecular weight above 250,000.

EXAMPLES 105-106

Tetra-n-butylammonium tetraphenylborate was added to 1 gram each of the cyclic copolymeric and homopolymeric spirobiindane bisphenol polycarbonate oligomers of Examples 81 and 82, and the mixtures were dissolved in 25 ml. of dry methylene chloride. The solutions were evaporated to dryness under vacuum and further for 4 hours at 110° C. in a nitrogen atmosphere. The solids were heated under nitrogen for 1 hour at 300° C. The polymeric products thus formed were dissolved in methylene chloride, reprecipitated by pouring into methanol, filtered and dried. The relevant parameters and properties are given in Table XI.

TABLE XI

| | Example | |
|---|---|---|
| | 105 | 106 |
| Cyclic product of Example | 81 | 82 |
| Catalyst, mole % | 1.2 | 1.0 |
| Mw | 105,400 | 26,740 |
| Tg, °C. | 188.4 | 202 |

EXAMPLES 107–111

Various cyclic oligomer mixtures were heated for one-half hour with 0.25 mole percent tetra-n-butylammonium tetraphenylborate and the resulting homopolycarbonates were isolated substantially as described in previous examples. The relevant parameters are given in Table XII, together with weight average molecular weights unless the polymers were insoluble in methylene chloride.

TABLE XII

| Example | Oligomer mixture of Example | Polymerization temp., °C. | Mw |
|---|---|---|---|
| 107 | 49 | 250 | 121,800 |
| 108 | 51 | 280 | 97,000 |
| 109 | 52 | 250 | 45,200 |
| 110 | 53 | 250 | — |
| 111 | 54 | 250 | 24,000 |

EXAMPLES 112–128

Various cyclic oligomer mixtures were blended in the amount of 10 mole percent with cyclic bisphenol A polycarbonate oligomer mixtures. The blends were heated at 250° C. for one-half hour with 0.25 mole percent tetra-n-butylammonium tetraphenylborate and the resulting copolycarbonates were isolated substantially as described in previous examples. The relevant parameters are given in Table XIII, together with weight average molecular weights unless the polymers were insoluble in methylene chloride.

TABLE XIII

| Example | Oligomer mixture of Example | Mw |
|---|---|---|
| 112 | 49 | 151,000 |
| 113 | 50 | 102,000 |
| 114 | 51 | 121,000 |
| 115 | 58 | 109,000 |
| 116 | 59 | 83,690 |
| 117 | 61 | 56,000 |
| 118 | 63 | 257,000 |
| 119 | 64 | 121,400 |
| 120 | 69 | 116,300 |
| 121 | 70 | 149,000 |
| 122 | 71 | 86,900 |
| 123 | 72 | 134,000 |
| 124 | 73 | 73,000 |
| 125 | 74 | 79,500 |
| 126 | 75 | 118,000 |
| 127 | 76 | 88,000 |
| 128 | 77 | 80,000 |

EXAMPLE 129

A mixture of 2 grams of the cyclic copolycarbonate oligomer mixture of Example 59, 6 mg. of tetra-n-butylammonium tetraphenylborate and 1 mole percent, based on allyl groups, of dicumyl peroxide was dissolved in 30 ml. of methylene chloride, vacuum stripped and dried for 4 hours under nitrogen at 110° C. It was then polymerized under nitrogen at 300° C. for 30 minutes. The resulting polymer was extracted with methylene chloride for 24 hours and the unextractable gel comprised 65% by weight of total resin, as compared with 0% in a control experiment in which the dicumyl peroxide was omitted.

EXAMPLE 130

A mixture of 2270 grams of a cyclic bisphenol A polycarbonate oligomer mixture similar to that of Example 35 and 5 grams of tetrabutylammonium tetraphenylborate was dry blended on a roller mill for 2½ hours and stored overnight in an oven at 110° C. It was then extruded in a Brabender single-screw extruder at temperatures in the range of 250°–275° C.

The extrudate was heated to 343° C. and injection molded at a mold temperature of 160° C. The molded articles had the following properties:

Tensile strength at yield—$6.22 \times 10^7$ pascals
Tensile strength at break—$7.05 \times 10^7$ pascals
Tensile elongation—74.1%
Flexural yield—$9.40 \times 10^7$ pascals
Flexural modulus—$2.19 \times 10^9$ pascals
Notched Izod impact strength—103.7 kg.-cm./cm.
Weight average molecular weight—101,600
Number average molecular weight—41,060.

EXAMPLE 131

A 2000-gram sample of cyclic bisphenol A polycarbonate oligomer mixture similar to that of Example 37, containing 0.1 mole percent tetrabutylammonium tetraphenylborate catalyst, was blended on a roller mill for 2 hours and dried for 3 hours at 110° C. It was then heated to 335° C. and injection molded for 15 seconds at a mold temperature of 205° C. The following properties are typical of the molded articles thus obtained:

Tensile strength at yield—$6.30 \times 10^7$ pascals
Tensile strength at break—$7.70 \times 10^7$ pascals
Tensile elongation—57.5%
Flexural yield—$9.57 \times 10^7$ pascals
Flexural modulus—$2.31 \times 10^9$ pascals
Notched Izod impact strength—74.0 kg.-cm./cm.

EXAMPLE 132

This example is a simulated laboratory procedure designed to demonstrate the adaptability of the cyclic oligomer mixtures of this invention to simultaneous polymerization and rotational molding.

A cyclic bisphenol A polycarbonate oligomer mixture similar to that of Example 42 was dissolved in minimum methylene chloride and 0.2 mole percent (based on structural units in the oligomer) of tetra-n-butylammonium tetraphenylborate was added. The mixture was thoroughly blended and the methylene chloride was evaporated, leaving a white solid which was dried under vacuum for 12 hours at 90° C. and ground to a fine powder.

A 200 ml. round-bottomed flask was charged with 1 gram of the catalyzed cyclics mixture and placed in an oven at an angle of about 15° from horizontal. It was rotated with a stirring motor at about 1200 rpm. and heated to 250° C. over a period of about 15 minutes. During this time, the mixture melted to a low viscosity material which covered the interior of the flask with a thin layer of polymerizing polycarbonate. Rotation at 250° C. was continued for 15 minutes, after which the flask was cooled and broken to remove the molded polycarbonate article, which was found to be transparent, of substantially even thickness and resistant to stretching and tearing. The polycarbonate therein had a weight average molecular weight greater than 90,000.

EXAMPLE 133

A laboratory-scale experiment similar in some respects to that of Example 132 was performed using a rotary evaporator, rotating at about 8–10 rpm.

A catalyst concentrate was prepared by dissolving in 100 ml. of methylene chloride 0.56 gram of tetra-n- butylammonium tetraphenylborate and 12.7 grams of a cyclic bisphenol A polycarbonate oligomer mixture similar to that of Example 36, containing about 30% high polymer. After thorough mixing of the solution had taken place, the methylene chloride was removed under vacuum and the solid residue was ground to a fine powder.

A solid blend of 14.4 grams of purified bisphenol A cyclic polycarbonate oligomer mixture, essentially free of high polymer, and 0.56 gram of the catalyst concentrate was charged to a 200-ml. round-bottomed flask which was mounted on the rotary evaporator. The system was evacuated to 25 torr and rotated at 8–10 rpm. for 12 minutes while the flask was immersed in an oil bath at 200° C. The flask was then charged with nitrogen to atmospheric pressure and the temperature was raised to 250° C. over about 15 minutes. The flask was then cooled to room temperature. It was found to have a thin skin of polymerized polycarbonate with a large, semi-transparent, bubble-free blob at the low point of the flask.

When the same procedure was followed using a catalyst concentrate which was also essentially free of high polymer, a thicker layer of polycarbonate containing some bubbles appeared on the sides of the flask. When the catalyst was uniformly dispersed in the entire resin sample as in Example 132, little tendency to flow was exhibited and the sample contained large numbers of bubbles. When the cyclics-catalyst mixture was replaced with a standard commercial bisphenol A polycarbonate having an intrinsic viscosity of 0.50 in methylene chloride at 25° C., flow was insufficient to form a continuous, uniform resin layer.

The cyclic oligomers of this invention, especially the polycarbonate oligomers, are also advantageously combined with inert filler materials to produce prepreg compositions which may be polymerized to thermoplastic composites having excellent impact resistance, moisture resistance and ductility. Such thermoplastic composites have a number of advantages over the somewhat more well known thermoset composites, such as the capability of being shaped after polymerization is completed.

Polycarbonates have previously not been in wide use for preparing continuous-fiber composites because of the difficulty in effectively infusing the polymer into the fiber tows. Polycarbonates prepared interfacially or by transesterification have molecular weights and viscosities so high that there is difficulty in achieving adequate wet-out for effective impregnation of continuous fibers therewith. Solution impregnation methods with such linear polycarbonates are inconvenient because of the necessity of removing and recycling solvent, and the temperatures required for melt impregnation are so high that the polycarbonate tends to undergo chemical degradation. These deficiencies are overcome by the oligomer mixtures of this invention.

Suitable fillers for the composites of this invention include talc, quartz, wood flour, finely divided carbon and silica. Continuous fiber fillers, including carbon, glass, highly oriented polyamide and boron fibers, are particularly useful. Carbon fibers are frequently preferred, especially when a particularly stiff composite article is desired. The filler may be in unidirectional form, either as yarns or as random fibers, or may be woven into fabric batts or tapes.

Certain filler materials are treated with a sizing composition compatible with some other resin system, typically an epoxy system. Under these circumstances it may be advantageous to remove the sizing before contacting the filler with the oligomer mixture. Removal may be effected by treating with a suitable solvent; pyrolytically by heating at a temperature up to about 400° C. (preferably in an inert atmosphere such as nitrogen, particularly when the filler is an oxidizable material such as carbon); or by other suitable procedures.

The prepreg compositions of this invention may contain up to about 70% filler by volume when a woven filler is used, and up to about 40% in the case of nonwoven fillers. Certain methods of prepreg preparation, more fully described hereinafter, may involve extruding the filled oligomer mixture at temperatures above 225° C., whereupon polymerization may be initiated. However, the polymerization rate is initially slow enough to be negligible for the time period required to impregnate the filler and complete the extrusion. The same is true when the prepreg is molded. Thus, the presence in the prepreg composition of a minor amount of polymerization product of the cyclic oligomer mixture (i.e., linear polycarbonate) is contemplated as part of the invention.

Various options for prepreg formation will be apparent to those skilled in the art. For example, the filler and the solid oligomer mixture may be combined in a cold mold, but this is not always convenient since the oligomer mixtures are powdery solids at room temperature. Alternatively, the oligomer mixture may be liquefied in a chamber external to the mold and passed in liquid form into the hot mold. It may first meet the filler in said chamber or in the mold itself, the latter option resulting in a resin transfer molding process. Other options are pultrusion and winding followed by extrusion.

Polymerization of the prepreg is typically conducted at the above-described polymerization temperatures and at conventional pressures. Because of the relatively low viscosity of the cyclic oligomer mixture at these temperatures, it may be preferable in molding operations to employ a matched die type of mold. It is generally advisable to coat mold surfaces with a suitable mold release agent, typically a silicone material, before charging it with the oligomer mixture.

Upon polymerization as described herein, fiber-reinforced polycarbonate articles are obtained which have excellent thermal stability, solvent resistance and other properties. Such articles are another aspect of the present invention.

The preparation of composites of this invention is illustrated by the following example.

EXAMPLE 134

The filler used was a commercially available graphite fabric containing 3000-filament count continuous AS4 fiber in a balanced 8-harness, satin-weave construction. Rectangular swaths of the fabric, 1.27×12.7 cm., were cut with the warp and weft directions coinciding with the swath edges. The swaths were placed, five in a stack, in a heat-resistant glass cylinder and nitrogen was passed through for 45 minutes. The temperature of the cylinder was then raised to 450° C. to remove the sizing from the graphite fibers. At about 400° C., thick black smoke was noted. After 60 minutes at 450° C., the tube was removed from the furnace and allowed to cool while nitrogen passage was continued. When the temperature of the tube reached 25° C., the fabric swaths were removed and stored in a vacuum desiccator.

A 10-gram sample of cyclic bisphenol A carbonate oligomer similar to those described in Examples 1–18 was dissolved in 100 ml. of methylene chloride and 160 microliters of a 0.1M solution of the bisisopropoxyaluminum salt of ethyl acetoacetate in toluene was added. The mixture was stirred and the solvent was stripped in a rotary evaporator, after which the oligomer-catalyst mixture was dried under nitrogen at 110° C.

A positive-pressure mold whose cavity size matched the dimensions of the graphite fabric swaths was sprayed with a commercially available silicone mold release agent. The mold was maintained at room temperature as a stack of five swaths of graphite fabric was placed therein, with oligomer powder being sprinkled uniformly between every two swaths to produce a 9-layer sandwich at a filler loading of 55% by volume. The mold was closed and transferred to a 445 kN. press whose platens were heated at 270° C. The mold was heated at 10° C. per minute to 250° C. under virtually no pressure. Above 200° C., the mold charge began to compact due to initial melting of the oligomer mixture. When the mold temperature had reached 250° C., 13.8 MPa. of pressure was applied for 15 minutes, whereupon the mold temperature increased to 265° C.

The mold was transferred to a similar press whose platens were water-cooled at about 20° C., with the pressure initially set at 13.8 MPa. When the mold had cooled to 50° C., it was opened and the molded article removed. It was jet black with a smooth, shiny, resin-rich surface, through which the details of the carbon fiber fabric were seen. Upon removal of a piece of the edge, an interior surface was revealed which contained no poorly impregnated fibers. When the article was dropped on a flat, hard surface, it produced a high pitch ring, generally associated with well impregnated carbon fiber composites.

A fragment of the article was removed and the resin was extracted with chloroform. Upon filtration of the chloroform extract and reprecipitation using methanol, the solid polycarbonate was obtained. After drying, its weight average molecular weight was found by gel permeation chromatography to be 57,570 (relative to polystyrene).

The article was subjected to 3-point bend testing according to ASTM method D790. It was found to have a Young's modulus of 69.7 GPa., an ultimate strength of 772 MPa. and a strain to failure of 1.11%.

Similar composite articles were prepared using type E glass fibers and highly oriented polyamide fibers sold under the trade name "Kevlar 49".

What is claimed is:

1. A method for preparing a composition comprising cyclic polycarbonate or thiol analog oligomers which comprises the steps of:

I. contacting (A) a composition comprising (1) at least one compound selected from the group consisting of bishaloformates and thiol analogs thereof, said compound having the formula $$R(Y^1COX)_2, \quad (III)$$

or a mixture thereof with (2) at least one difunctional compound having the formula $$R(Y^3H)_2, \quad (IV)$$

or an alkali metal salt thereof; wherein at least about 60% of the total number of R values are aromatic organic radicals and the balance thereof are aliphatic, alicyclic or aromatic organic radicals, X is chlorine or bromine, each $Y^1$ is independently oxygen or sulfur and each $Y^3$ is independently sulfur when the corresponding R is aliphatic or alicyclic and oxygen or sulfur when the corresponding R is aromatic; with (B) at least one oleophilic aliphatic or heterocyclic tertiary amine and (C) an aqueous alkali metal hydroxide solution having a concentration of about 0.1-16M;

said contact being effected under conditions resulting in high dilution of (A), or the equivalent thereof, in a substantially non-polar organic liquid which forms a two-phase system with water, and subsequently II. separating the resulting cyclic oligomer mixture from at least a portion of any high polymer and insoluble material present.

2. A method according to claim 1 wherein (A) consists essentially of a bischloroformate in which each $Y^1$ is oxygen and X is chlorine.

3. A method according to claim 2 wherein R has the formula $$-A^1-Y^2-A^2-, \quad (II)$$

wherein each of $A^1$ and $A^2$ is a single-ring divalent aromatic radical and $Y^2$ is a bridging radical in which one or two atoms separate $A^1$ from $A^2$.

4. A method according to claim 3 wherein each of $A^1$ and $A^2$ is p-phenylene and $Y^2$ is isopropylidene.

5. A method according to claim 4 wherein (B) is triethylamine, (C) is sodium hydroxide and the organic liquid is methylene chloride.

6. A method for preparing a composition comprising cyclic polycarbonate or thiol analog oligomers which comprises effecting contact in a two-phase system between (A) a composition comprising (1) at least one compound selected from the group consisting of bishaloformates and thiol analogs thereof, said compounds having the formula $$R(Y^1COX)_2, \quad (III)$$

or a mixture thereof with (2) at least one difunctional compound having the formula $$R(Y^3H)_2, \quad (IV)$$

or an alkali metal salt thereof; wherein at least about 60% of the total number of R values are aromatic organic radicals and the balance thereof are aliphatic, alicyclic or aromatic organic radicals, X is chlorine or bromine, each $Y^1$ is independently oxygen or sulfur and each $Y^3$ is sulfur when R is aliphatic or alicyclic and oxygen or sulfur when the corresponding R is aromatic;

(B) at least one aliphatic or heterocyclic tertiary amine which has an organic-aqueous partition coefficient greater than 1; and (C) an aqueous alkali metal hydroxide solution having a concentration of about 0.1-10M;

by gradually adding (A) and at least a portion of (B) and (C) to a substantially non-polar organic liquid which forms a two-phase system with water, or to a mixture of said liquid with water, said liquid or mixture being maintained at a temperature in the range of about 0°-50° C.;

the amount of (A) used being up to about 0.7 mole for each liter of said organic liquid present in the reaction system, and the molar proportions of (A), (B) and (C) being approximately as follows:

(B):(A)—0.06–2.0:1
(C):(A)—2–3:1;

and recovering the cyclic oligomers thus formed.

7. A method according to claim 6 wherein (A) consists essentially of (1).

8. A method according to claim 7 wherein each $Y^1$ is oxygen and X is chlorine.

9. A method according to claim 8 wherein R has the formula $$-A^1-Y^2-A^2-, \qquad (II)$$

wherein each of $A^1$ and $A^2$ is a single-ring divalent aromatic radical and $Y^2$ is a bridging radical in which one or two atoms separate $A^1$ from $A^2$.

10. A method according to claim 9 wherein about 40–95% by weight of (B) is introduced initially and the balance is added continuously or incrementally.

11. A method according to claim 9 wherein (A) is a crude bischloroformate product.

12. A method according to claim 11 wherein each of $A^1$ and $A^2$ is p-phenylene and $Y^2$ is isopropylidene.

13. A method according to claim 12 wherein (B) is triethylamine, (C) is sodium hydroxide and the organic liquid is methylene chloride.

14. A method according to claim 13 wherein about 40–95% by weight of (B) is introduced initially and the balance is added continuously or incrementally.

* * * * *